United States Patent [19]
Erickson et al.

[11] 3,745,481
[45] July 10, 1973

[54] ELECTRODES FOR OBTAINING UNIFORM DISCHARGES IN ELECTRICALLY PUMPED GAS LASERS

[75] Inventors: George F. Erickson; Thomas F. Stratton, both of Los Alamos, N. Mex.

[73] Assignee: The United States of America as represented by the United States Atomic Energy Commission, Washington, D.C.

[22] Filed: June 13, 1972

[21] Appl. No.: 262,415

[52] U.S. Cl. ............................................. 331/94.5
[51] Int. Cl. ............................................ H01s 3/09
[58] Field of Search .................... 313/311; 331/94.5

[56] References Cited
OTHER PUBLICATIONS

MacNair, Study of Electron Emitters for Use in Gas Lasers. IEEE J. Quant Elect., Vol. QE-5, No. 9 (September 1969) pp. 460–470.

*Primary Examiner*—William L. Sikes
*Attorney*—Roland A. Anderson

[57] ABSTRACT

Uniform "glow-type" electrical discharges are established in gaseous laser media at atmospheric pressure through use of dielectric electrodes consisting of ferroelectric ceramic materials. These electrodes may be used to produce both volume ionization and molecular excitation of the media or alternatively a second set of electrodes operating transversely to the dielectric electrodes may be used for molecular excitation, i.e., electrical pumping, of the gas volume.

4 Claims, 9 Drawing Figures

3,745,481

ELECTRODES FOR OBTAINING UNIFORM DISCHARGES IN ELECTRICALLY PUMPED GAS LASERS

BACKGROUND OF THE INVENTION

The invention described herein was made in the course of, or under, a contract with the U. S. ATOMIC ENERGY COMMISSION. It relates to electrodes for obtaining uniform discharges in electrically pumped gas lasers and more particularly to dielectric electrodes of ferroelectric ceramic materials.

The literature discloses a variety of attempts at achieving uniform electrical discharges in laser gases at pressures greater than about 200 Torr—the pressure at which conduction begins to occur as a channel or spark discharge rather than a uniform glow-type discharge through the entire volume of the gas. One approach is directed toward mechanical subdivision of the discharge electrodes, with separate current sources for each subdivision. Resistive current limiters, fed from a common energy source, represent the usual form of this arrangement, although separate energy sources (condensers) are also successful. Recently, the problem has been attacked differently through separation of the mechanism which produces the current carriers (ionization) from the mechanism of molecular excitation (inelastic electron collisions). Volume ionization is produced by irradiation of the gas with a flux of high energy electrons, while the simultaneous application of an electric field below the breakdown limit of the gaseous lasing media pumps energy into the molecules.

The use of dielectric materials in conjunction with electrodes in electrically pumped gas lasers is well known in the art. The literature discloses numerous so-called "double discharge" lasers in which at least one electrode is covered with a dielectric material. See, e.g., A. K. Laflamme, "Double Discharge Excitation for Atmospheric Pressure $CO_2$ Lasers," 41 Rev. Sci. Instr. 1578 (1970). The presence of the dielectric favors uniformity of electron emission and prevents the formation of arcs. Unfortunately, the low energy densities which can be accommodated without damage to the dielectric materials heretofore disclosed has limited the use of such dielectric covered electrodes to the formation of the preliminary discharge used to preionize the laser gas, after which the gas is electrically pumped by a much more energetic discharge between other electrodes.

SUMMARY OF THE INVENTION

We have now found that uniform, high-energy, glow-type discharges can be produced between dielectric electrodes consisting of ferroelectric ceramic materials. Particularly useful for this purpose are ferroelectric ceramics consisting substantially of barium titanate. Ferroelectric ceramic electrodes may be used to produce both volume ionization and molecular excitation of a high-pressure lasing media or alternatively a second set of electrodes operating transversely to the dielectric electrodes may be used for molecular excitation, i.e., electrical pumping, of the gas volume.

DESCRIPTION OF THE PREFERRED EMBODIMENT

Figure 1:
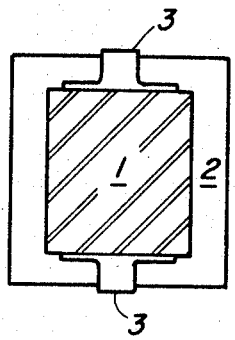
FIG. 1 shows the construction of a commercial high voltage filter capacitor from which the dielectric electrodes used to obtain the experimental data herein disclosed were derived.

Dielectric electrodes 4 (see FIGS. 2 through 4) were prepared by cutting in two commercially available ceramic high voltage filter capacitors of the type shown in FIG. 1. These capacitors, produced by the Sprague Electric Company and carrying the designation Type 715C, have a ferroelectric ceramic core 1 surrounded by a resin encapsulation 2 with opposing electrodes 3 extending from core 1 through encapsulation 2. Core 1 consists substantially of barium titanate ($BaTiO_3$) which has the following properties:

| | |
|---|---|
| Dielectric constant | 4100 |
| Dielectric strength | 18 kV/cm |
| Curie temperature | 33°C |
| Energy Density (18 kV/cm) | 60 mJ/cc |

Figure 2:
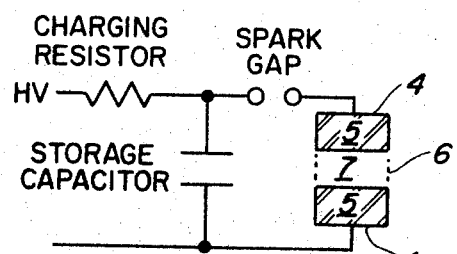
FIG. 2 shows a first circuit which may be used with the ferroelectric electrodes of this invention.
Figure 3:
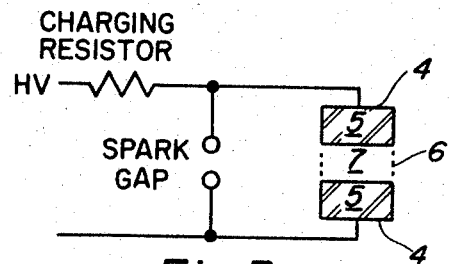
FIG. 3 shows a second circuit which may be used with the ferroelectric electrodes of this invention.
Figure 4:
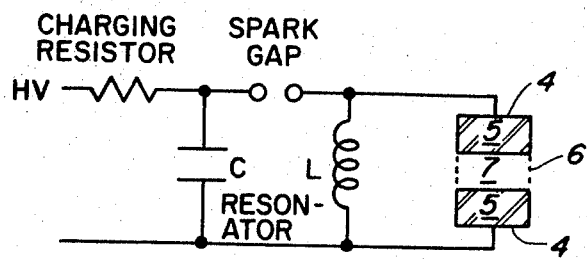
FIG. 4 shows a third circuit which may be used with the ferroelectric electrodes of this invention.

Discharges were initiated between electrodes 4 facing ferroelectric ceramic discs 5 1.9 cm in diameter and 2 cm thick using the electrical circuits shown in FIGS. 2 through 4. The separation between the faces of the ceramic discs 5 (gas discharge region) was 1 or 2 cm. These circuits respectively represent pulse charging from a storage capacitor (FIG. 2), pulse discharge after dc charging (FIG. 3), and breakdown and charge from an LC ringing circuit (FIG. 4).

Figure 5:
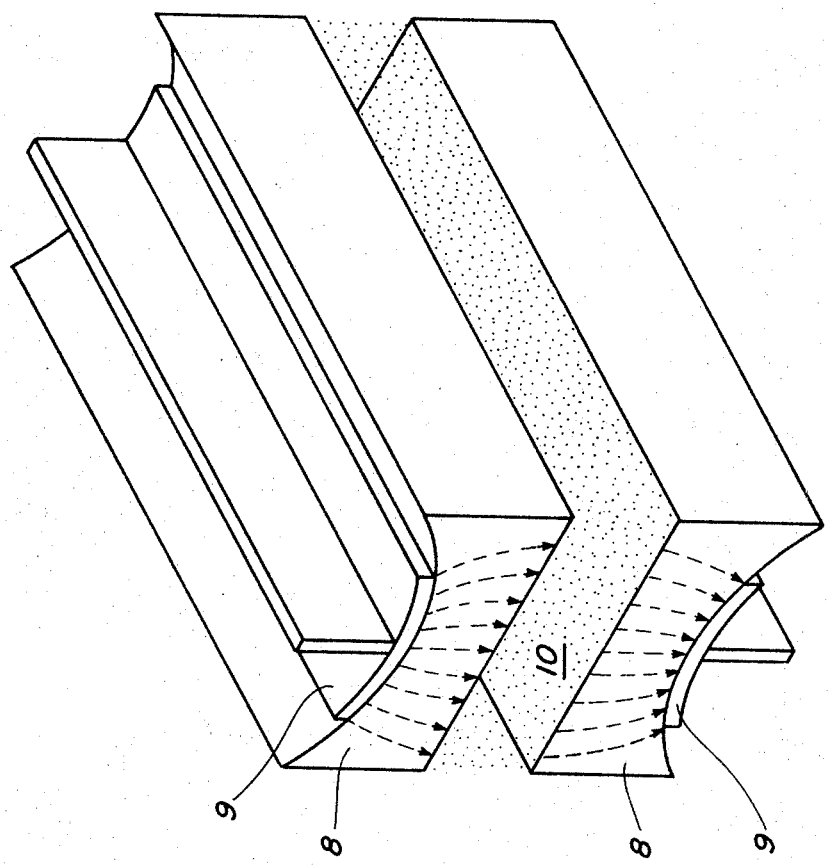
FIG. 5 shows rail-type ferroelectric electrodes useful for reducing corner sparks and streamers.

The currents shown in FIGS. 2 through 4 all produce discharges reasonably free from spark channels. Those streamers and spark elements which are present are principally associated with the rim of the ceramic at the ceramic-resin interface. The stress accumulation and discontinuities in dielectric constant responsible for the spark channels and streamers can be substantially reduced by fabricating strip or rail ceramic electrodes of the general type shown in FIG. 5. Each rail 8 is composed of a ceramic ferroelectric and is attached to a metal electrode 9. A gaseous lasing media 10 is placed in the volume between rails 8.

Figure 6:
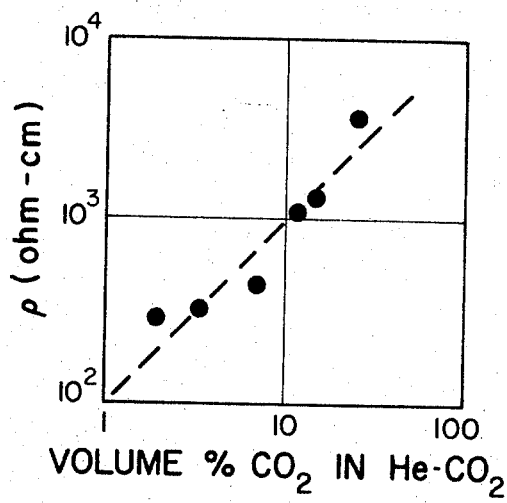
FIG. 6 indicates the volume resistivity of a helium-carbon dioxide mixture as a function of $CO_2$ concentration.

The resistive impedance of a gas load between ferroelectric ceramic electrodes spaced 2 cm apart and having an applied voltage of 20 kV was determined for $He-CO_2$ mixtures at 580 Torr as a function of $CO_2$ concentration. As shown in FIG. 6, the resistivity increases linearly, or slightly more than linearly, as a function of $CO_2$ concentration. These results are in marked contrast to the customary experience with discharges between metal electrodes which produce spark channels with negligible resistive impedances for these gas compositions at this pressure.

Figure 7:
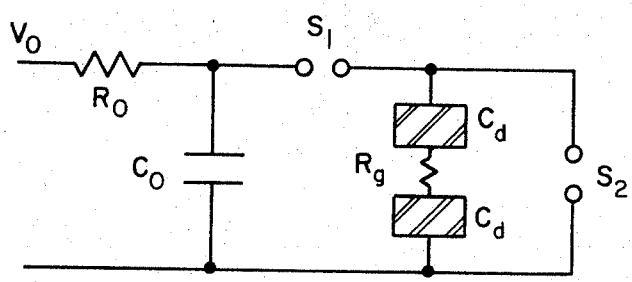
FIG. 7 is a schematic of an equivalent circuit for excitation of gases through dielectric layers.

Ferroelectric ceramic electrodes may be used not only to ionize the lasing gas mixture but also to pump energy into it. The excitation of a gaseous load contained between two dielectric layers may be analyzed by reference to FIG. 7. As the initial conditions, all capacitors are uncharged. The high voltage is applied to $C_o$ through $R_o$ so that the voltage on $C_o$ increases toward $V_o$ with a time constant $R_o C_o$. At a voltage V, the gas $S_1$ breaks down, connecting the load to the storage capacitor $C_o$. The gas breaks down, current passes through $C_d$, $R_g$ and $C_d$ until the voltage across the load $V_f$ is equal to the voltage on $C_o$. If ½ $C_d << C_o$, this voltage is nearly V. An analysis of such charging, or discharging circuits, shows that $$\int_0^\infty I^2 R_g dt = \frac{1}{4} C_d V_f^2. \quad (1)$$

An energy is dissipated in the gas load (neglecting the impedance of the switch $S_1$) which equals the energy stored in the dielectric layers. In principle, if one is able to open $S_1$ and close $S_2$, the energy ¼ $C_d V_f^2$ stored in the dielectric layers is discharged through $R_g$ and $S_2$ allowing the gas to be excited with 100 percent efficiency from the power supply, neglecting switch losses and dissipation in the dielectric. In practice, it is difficult to open $S_1$ in a time short enough to be of interest.

Figure 8:
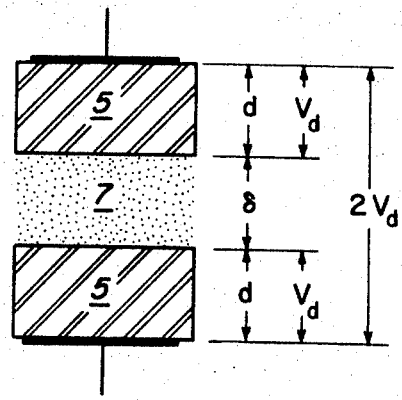
FIG. 8 is a schematic representation of the electrode-gas geometry in one embodiment of this invention.

FIG. 8 is a schematic representation of the electrode-gas geometry. As a consequence of the charging pulse, there is deposited in lasing gas 7 an energy per unit area which is $$2 (KE^2/8\pi) d = W_g \delta \quad (2)$$

where $KE^2/8\pi = W_f$ is the energy density in the ferroelectric 5 and $W_g$ is the energy density in the gas. Hence we see that for a single charging pulse, the energy density in the gas 7 is $$W_g = 2 d/\delta \, W_f \quad (3)$$

Figure 9:
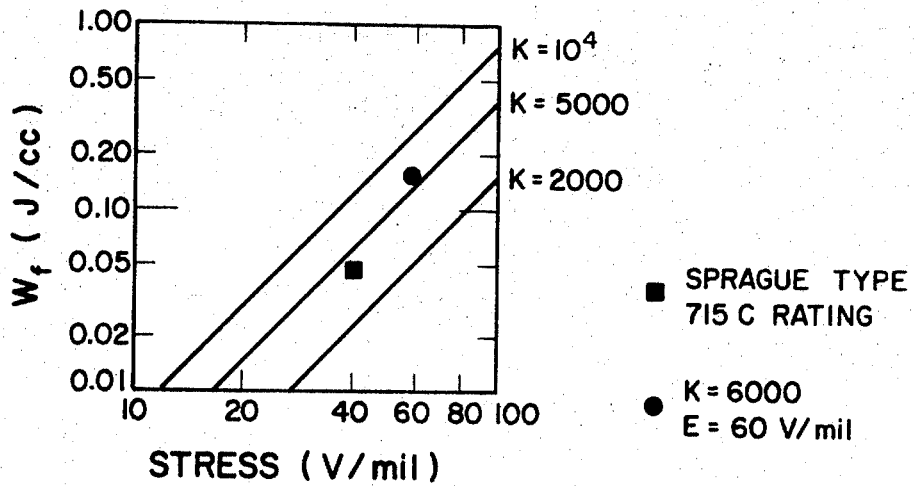
FIG. 9 indicates the energy density in ferroelectric materials as a function of working stress.

The energy densities possible with ferroelectrics are shown in FIG. 9. It appears probable that improvements over the rated performance of the Sprague Type 715C ferroelectric capacitors can be readily achieved. The Sprague capacitors are tested against failure at 1.5 times the rated working stress. In addition, the dielectric constant can be increased to perhaps 6000 by hot pressing the ceramic rather than the present practice of cold pressing with suitable binder material (Point * in FIG. 9).

The breakdown stress of laser gas mixtures at atmospheric pressure is approximately the same but somewhat less than the working stress of bulk ferroelectric ceramics. This means that $d/\delta$ in Eq. (3) can be of the order of unity, and that gas energy densities in the range of 200 to 300 mJ/cc are possible with a single charging or discharging cycle of the ferroelectric electrodes.

What we claim is:

1. In an electrically pumped gas laser, the improvement consisting of first and second electrodes of a bulk ferroelectric ceramic, said electrodes having substantially parallel flat surfaces of said ceramic exposed to the laser gas, and means operatively connected to said electrodes for producing a potential across said electrodes sufficient to provide substantial ionization within the volume of laser gas to be electrically pumped.

2. The laser of claim 1 having means operatively connected to said electrodes for producing a potential across said electrodes sufficient to provide both volume ionization and molecular excitation of the laser gas.

3. The laser of claim 1 wherein said bulk ferroelectric ceramic is substantially barium titanate.

4. The laser of claim 1 wherein said lasing gas is a mixture of He, $CO_2$, and $N_2$.

* * * * *